(12) United States Patent
Pan et al.

(10) Patent No.: US 7,164,284 B2
(45) Date of Patent: Jan. 16, 2007

(54) DYNAMIC GAMMA FOR A LIQUID CRYSTAL DISPLAY

(75) Inventors: Hao Pan, Vancouver, WA (US);
Xiao-fan Feng, Vancouver, WA (US);
Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 10/965,059

(22) Filed: Oct. 13, 2004

(65) Prior Publication Data

US 2005/0134302 A1  Jun. 23, 2005

Related U.S. Application Data

(60) Provisional application No. 60/603,457, filed on Aug. 21, 2004, provisional application No. 60/531,441, filed on Dec. 18, 2003.

(51) Int. Cl.
*G01R 31/00* (2006.01)

(52) U.S. Cl. .......................... 324/770; 324/750; 349/87

(58) Field of Classification Search ................ 324/770; 345/89, 87, 205, 206, 589, 204, 102; 349/61, 349/42, 141–144, 140; 348/674
See application file for complete search history.

(56) References Cited

U.S. PATENT DOCUMENTS

| | | |
|---|---|---|
| 3,329,474 A | 7/1967 | Harris et al. |
| 3,375,052 A | 3/1968 | Kosanke et al. |
| 3,428,743 A | 2/1969 | Hanlon |
| 3,439,348 A | 4/1969 | Harris et al. |
| 3,499,700 A | 3/1970 | Harris et al. |
| 3,503,670 A | 3/1970 | Kosanke et al. |
| 3,554,632 A | 1/1971 | Chitayal |
| 3,947,227 A | 3/1976 | Granger et al. |
| 4,012,116 A | 3/1977 | Yevick |
| 4,110,794 A | 8/1978 | Lester et al. |
| 4,170,771 A | 10/1979 | Bly |
| 4,385,806 A | 5/1983 | Fergason |
| 4,410,238 A | 10/1983 | Hanson |
| 4,441,791 A | 4/1984 | Hornbeck |
| 4,516,837 A | 5/1985 | Soref et al. |

(Continued)

FOREIGN PATENT DOCUMENTS

EP   0 606 162   7/1994

(Continued)

OTHER PUBLICATIONS

Fumiaki Yamada and Yoichi Taira, "An LED backlight for color LCD," IBM Research, Tokyo Research Laboratory, Japan, pp. 363-366, IDW 2000, (no month/date).

(Continued)

*Primary Examiner*—Minh N. Tang
(74) *Attorney, Agent, or Firm*—Chernoff, Vilhauer, McClung & Stenzel

(57) ABSTRACT

A system for characterizing the temporal luminance response of a liquid crystal display. A liquid crystal display may be forced at an initial time from a first luminance value to a measured second luminance value. The second luminance value may be measured at a predetermined time after the initial time.

11 Claims, 6 Drawing Sheets

U.S. PATENT DOCUMENTS

| | | |
|---|---|---|
| 4,540,243 A | 9/1985 | Fergason |
| 4,562,433 A | 12/1985 | Biferno |
| 4,574,364 A | 3/1986 | Tabata et al. |
| 4,611,889 A | 9/1986 | Buzak |
| 4,648,691 A | 3/1987 | Oguchi et al. |
| 4,649,425 A | 3/1987 | Pund |
| 4,682,270 A | 7/1987 | Whitehead et al. |
| RE32,521 E | 10/1987 | Fergason |
| 4,715,010 A | 12/1987 | Inoue et al. |
| 4,719,507 A | 1/1988 | Bos |
| 4,755,038 A | 7/1988 | Baker |
| 4,758,818 A | 7/1988 | Vatne |
| 4,766,430 A | 8/1988 | Gillette et al. |
| 4,834,500 A | 5/1989 | Hilsum et al. |
| 4,862,496 A | 8/1989 | Nishio |
| 4,885,783 A | 12/1989 | Whitehead et al. |
| 4,888,690 A | 12/1989 | Huber |
| 4,910,413 A | 3/1990 | Tamune |
| 4,917,452 A | 4/1990 | Liebowitz |
| 4,933,754 A | 6/1990 | Reed et al. |
| 4,954,789 A | 9/1990 | Sampsell |
| 4,958,915 A | 9/1990 | Okada et al. |
| 4,969,717 A | 11/1990 | Mallinson |
| 4,981,838 A | 1/1991 | Whitehead |
| 4,991,924 A | 2/1991 | Shankar et al. |
| 5,012,274 A | 4/1991 | Dolgoff |
| 5,013,140 A | 5/1991 | Healey et al. |
| 5,074,647 A | 12/1991 | Fergason et al. |
| 5,075,789 A | 12/1991 | Jones et al. |
| 5,083,199 A | 1/1992 | Borner |
| 5,122,791 A | 6/1992 | Gibbons et al. |
| 5,128,782 A | 7/1992 | Wood |
| 5,138,449 A | 8/1992 | Kerpchar |
| 5,144,292 A | 9/1992 | Shiraishi et al. |
| 5,164,829 A | 11/1992 | Wada |
| 5,168,183 A | 12/1992 | Whitehead |
| 5,187,603 A | 2/1993 | Bos |
| 5,202,897 A | 4/1993 | Whitehead |
| 5,206,633 A | 4/1993 | Zalph |
| 5,214,758 A | 5/1993 | Ohba et al. |
| 5,222,209 A | 6/1993 | Murata et al. |
| 5,247,366 A | 9/1993 | Ginosar et al. |
| 5,256,676 A | 10/1993 | Hider et al. |
| 5,300,942 A | 4/1994 | Dolgoff |
| 5,305,146 A | 4/1994 | Nakagaki et al. |
| 5,311,217 A | 5/1994 | Guerin et al. |
| 5,313,225 A | 5/1994 | Miyadera |
| 5,317,400 A | 5/1994 | Gurley et al. |
| 5,339,382 A | 8/1994 | Whitehead |
| 5,357,369 A | 10/1994 | Pilling et al. |
| 5,359,345 A | 10/1994 | Hunter |
| 5,369,266 A | 11/1994 | Nohda et al. |
| 5,386,253 A | 1/1995 | Fielding |
| 5,394,195 A | 2/1995 | Herman |
| 5,395,755 A | 3/1995 | Thorpe et al. |
| 5,416,496 A | 5/1995 | Wood |
| 5,422,680 A | 6/1995 | Lagoni et al. |
| 5,426,312 A | 6/1995 | Whitehead |
| 5,436,755 A | 7/1995 | Guerin |
| 5,450,498 A | 9/1995 | Whitehead |
| 5,461,397 A | 10/1995 | Zhang et al. |
| 5,477,274 A | 12/1995 | Akiyoshi et al. |
| 5,481,637 A | 1/1996 | Whitehead |
| 5,570,210 A | 10/1996 | Yoshida et al. |
| 5,579,134 A | 11/1996 | Lengyel |
| 5,580,791 A | 12/1996 | Thorpe et al. |
| 5,592,193 A | 1/1997 | Chen |
| 5,617,112 A | 4/1997 | Yoshida et al. |
| 5,642,015 A | 6/1997 | Whitehead et al. |
| D381,355 S | 7/1997 | Whitehead |
| 5,650,880 A | 7/1997 | Shuter et al. |
| 5,652,672 A | 7/1997 | Huignard et al. |
| 5,661,839 A | 8/1997 | Whitehead |
| 5,682,075 A | 10/1997 | Bolleman et al. |
| 5,684,354 A | 11/1997 | Gleckman |
| 5,689,283 A | 11/1997 | Shirochi |
| 5,715,347 A | 2/1998 | Whitehead |
| 5,717,422 A | 2/1998 | Fergason |
| 5,729,242 A | 3/1998 | Margerum et al. |
| 5,754,159 A | 5/1998 | Wood et al. |
| 5,767,837 A | 6/1998 | Hara |
| 5,784,181 A | 7/1998 | Loiseaux et al. |
| 5,796,382 A | 8/1998 | Beeteson |
| 5,854,662 A | 12/1998 | Yuyama et al. |
| 5,886,681 A | 3/1999 | Walsh et al. |
| 5,889,567 A | 3/1999 | Swanson et al. |
| 5,892,325 A | 4/1999 | Gleckman |
| 5,901,266 A | 5/1999 | Whitehead |
| 5,939,830 A | 8/1999 | Praiswater |
| 5,959,777 A | 9/1999 | Whitehead |
| 5,969,704 A | 10/1999 | Green et al. |
| 5,978,142 A | 11/1999 | Blackham et al. |
| 5,986,628 A | 11/1999 | Tuenge et al. |
| 5,995,070 A | 11/1999 | Kitada |
| 5,999,307 A | 12/1999 | Whitehead et al. |
| 6,024,462 A | 2/2000 | Whitehead |
| 6,025,583 A | 2/2000 | Whitehead |
| 6,043,591 A | 3/2000 | Gleckman |
| 6,050,704 A | 4/2000 | Park |
| 6,064,784 A | 5/2000 | Whitehead et al. |
| 6,079,844 A | 6/2000 | Whitehead et al. |
| 6,111,559 A | 8/2000 | Motomura et al. |
| 6,111,622 A | 8/2000 | Abileah |
| 6,120,588 A | 9/2000 | Jacobson |
| 6,120,839 A | 9/2000 | Comiskey et al. |
| 6,129,444 A | 10/2000 | Tognoni |
| 6,160,595 A | 12/2000 | Kishimoto |
| 6,172,798 B1 | 1/2001 | Albert et al. |
| 6,215,920 B1 | 4/2001 | Whitehead et al. |
| 6,243,068 B1 | 6/2001 | Evanicky et al. |
| 6,267,850 B1 | 7/2001 | Bailey et al. |
| 6,268,843 B1 | 7/2001 | Arakawa |
| 6,276,801 B1 | 8/2001 | Fielding |
| 6,300,931 B1 | 10/2001 | Someya et al. |
| 6,300,932 B1 | 10/2001 | Albert |
| 6,304,365 B1 | 10/2001 | Whitehead |
| 6,323,455 B1 | 11/2001 | Bailey et al. |
| 6,323,989 B1 | 11/2001 | Jacobson et al. |
| 6,327,072 B1 | 12/2001 | Comiskey et al. |
| RE37,594 E | 3/2002 | Whitehead |
| 6,359,662 B1 | 3/2002 | Walker |
| 6,377,383 B1 | 4/2002 | Whitehead et al. |
| 6,384,979 B1 | 5/2002 | Whitehead et al. |
| 6,414,664 B1 | 7/2002 | Conover et al. |
| 6,418,253 B1 | 7/2002 | Whitehead et al. |
| 6,428,189 B1 | 8/2002 | Hochstein |
| 6,437,921 B1 | 8/2002 | Whitehead |
| 6,439,731 B1 | 8/2002 | Johnson et al. |
| 6,448,944 B1 | 9/2002 | Ronzani et al. |
| 6,448,951 B1 | 9/2002 | Sakaguchi et al. |
| 6,448,955 B1 | 9/2002 | Evanicky et al. |
| 6,452,734 B1 | 9/2002 | Whitehead et al. |
| 6,483,643 B1 | 11/2002 | Zuchowski |
| 6,559,827 B1 | 5/2003 | Mangerson |
| 6,574,025 B1 | 6/2003 | Whitehead et al. |
| 6,590,561 B1 | 7/2003 | Kabel et al. |
| 6,657,607 B1 | 12/2003 | Evanicky et al. |
| 6,680,834 B1 | 1/2004 | Williams |
| 6,791,520 B1 * | 9/2004 | Choi ............... 345/89 |
| 6,803,901 B1 | 10/2004 | Numao |
| 6,816,141 B1 | 11/2004 | Fergason |
| 6,828,816 B1 * | 12/2004 | Ham ............... 324/770 |
| 6,885,369 B1 * | 4/2005 | Tanahashi et al. ...... 345/426 |
| 6,891,672 B1 | 5/2005 | Whitehead et al. |

| | | | |
|---|---|---|---|
| 2001/0035853 A1 | 11/2001 | Hoelen et al. | |
| 2001/0038736 A1 | 11/2001 | Whitehead et al. | |
| 2002/0057253 A1 | 5/2002 | Lim et al. | |
| 2002/0063963 A1 | 5/2002 | Whitehead et al. | |
| 2002/0105709 A1 | 8/2002 | Whitehead et al. | |
| 2002/0135553 A1 | 9/2002 | Nagai et al. | |
| 2002/0159002 A1 | 10/2002 | Chang | |
| 2002/0159692 A1 | 10/2002 | Whitehead et al. | |
| 2002/0171617 A1 | 11/2002 | Fuller | |
| 2003/0048393 A1 | 3/2003 | Sayag | |
| 2003/0090455 A1 | 5/2003 | Daly | |
| 2003/0107538 A1 | 6/2003 | Asao et al. | |
| 2003/0132905 A1* | 7/2003 | Lee et al. | 345/89 |
| 2004/0057017 A1 | 3/2004 | Childers et al. | |
| 2004/0263450 A1* | 12/2004 | Lee et al. | 345/87 |

FOREIGN PATENT DOCUMENTS

| | | |
|---|---|---|
| EP | 0 829 747 | 3/1998 |
| EP | 1 202 244 | 5/2002 |
| FR | 2 611 389 | 9/1988 |
| JP | 01 098383 | 4/1989 |
| JP | 3-198026 | 8/1991 |
| JP | 05 289044 | 11/1993 |
| JP | 06 247623 | 9/1994 |
| JP | 06 313018 | 11/1994 |
| JP | 7-121120 | 5/1995 |
| JP | 9-244548 | 9/1997 |
| JP | 11 052412 | 2/1999 |
| JP | 2000/206488 | 7/2000 |
| JP | 2000/275995 | 10/2000 |
| JP | 2000/321571 | 11/2000 |
| JP | 2002/091385 | 3/2002 |
| WO | WO 91/15843 | 10/1991 |
| WO | WO 96/33483 | 10/1996 |
| WO | WO 00/75720 | 12/2000 |
| WO | WO 01/69584 | 9/2001 |
| WO | WO 02/03687 | 1/2002 |

OTHER PUBLICATIONS

T.Funamoto, T.Kobayashi, T.Murao, "High-Picture-Quality Technique for LCD televisions: LCD-AI," AVC Products Development Center, Matsushita Electric Industrial, Co. Ltd. 1-1 Matsushita-cho, Ibaraki, Osaka 567-0026 Japan. pp. 1157-1158, IDW Nov. 2000, (no date).

Fumiaki Yamada, Hajime Hakamura, Yoshitami Sakaguchi, and Yoichi Taira, "52.2: Invited Paper: Color Sequential LCD Based on OCB with an LED Backlight," Tokyo Research Laboratory, IBM Research, Yamato, Kanagawa, Japan, SID 2000 Digest, pp. 1180-1183, (no date/month).

N. Cheung et al., "Configurable Entropy Coding Scheme for H.26L," ITU Telecommunications Standardization Sector Study Group 16, Elbsee, Germany, Jan. 2001, (no date).

* cited by examiner

DYNAMIC GAMMA FOR A LIQUID CRYSTAL DISPLAY

This application claims priority from U.S. Provisional Application No. 60/531,441, filed Dec. 18, 2003, and U.S. Provisional Application No. 60/603,457, filed Aug. 21, 2004.

BACKGROUND OF THE INVENTION

The present application relates to measurement techniques for characterizing the response of a liquid crystal display.

With liquid crystal display's advantage on size, weight, style, power consumption and/or modulation transfer function in comparison to many other display technologies, the liquid crystal based displays are more commonly being used for displaying video, such as television broadcasts. Liquid crystal displays compared with traditional cathode ray tube and plasma displays, however, tend to have a significant shortcoming related to motion blur of moving images. One of the principal reasons for motion blur in a liquid crystal panel is that the panel has a relatively slow temporal response in comparison to the frame rate of typical video. Significant effort has been made to accelerate the liquid crystal panel's temporal response, and one of these techniques is generally referred to as overdrive technology. To measure the response of the liquid crystal panels a response time may be used.

Response time is typically defined as the arrival time at 90% of the difference between the starting luminance and the targeted luminance. The concept of response time for liquid crystal displays was historically developed to describe the characteristics of on-off black-white liquid crystal panels. To describe liquid crystal panels with gray-level capability, a set of response times (typically 9×9) that sample and cover the range of driving values are measured and are typically represented by three dimensional bar graphs. It has been noted that the definition of response time gives larger error tolerance to the transitions with larger difference between starting and targeted luminance. For example, response time from 0 to 255 is measured at the time when the actual luminance reaches 229.5, while response time from 200 to 255 is measured at the time when the actual luminance reaches 249.5. Although the two transitions seemingly share the same target luminance, the actual response times are actually measured at different ending luminance values (249.5 and 229.5 respectively).

A metric for moving picture response time (MPRT), has been developed by an industrial working group. MPRT is based on measuring the blurred width of camera-captured moving sharp edges on the screen of a display device. The camera imitates the human visual system (HVS) with smooth pursuit and integration effects. Therefore, MPRT can be used not only to describe LC panels, but also to perform comparisons with PDP and CRT as well. However, MPRT is not a desirable metric for quantitatively describing the temporal response of a liquid crystal panel. Most importantly, MPRT mixes together the two blurring factors of a liquid crystal panel: its hold-type display and its slow temporal response. Also, obtaining a MPRT measurement is complicated. To effectively obtain a MPRT measurement the system needs to mimic the two effects in the human visual system, namely, smooth pursuit and integration. While integration may only require properly setting the camera's exposure time, smooth pursuit tends to require that the camera chases the motion of sharp edges. Due to implementation difficulty of smooth pursuit, as many as four different methods have been developed. Two of them make the camera lens physically pursue the moving object (e.g., common pursuit). Because the camera pursuit tends to be expensive, the other two simpler methods calculate the results from still camera lens plus mathematical models of pursuit and integration effects.

DETAILED DESCRIPTION OF THE PREFERRED EMBODIMENT

Figure 1:
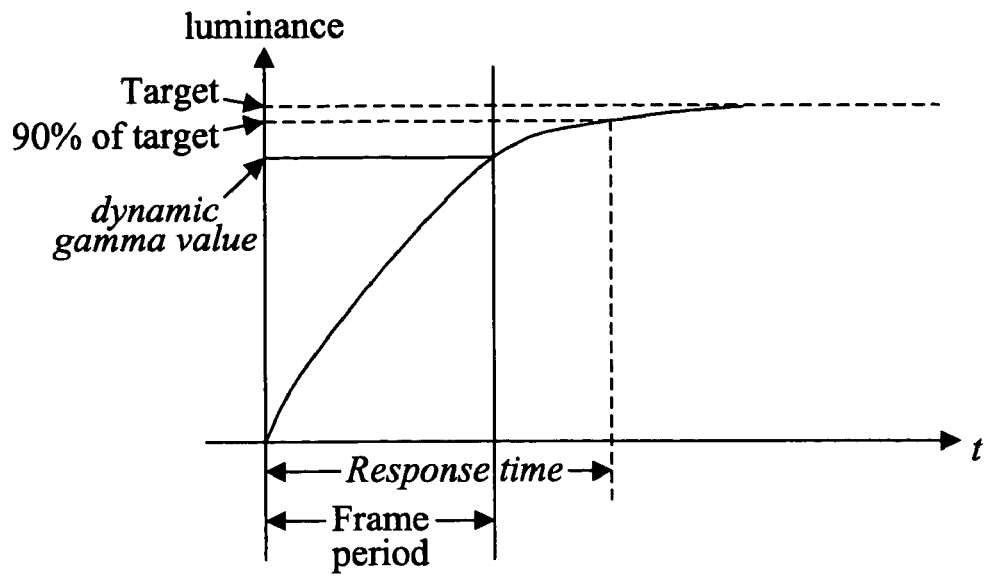
FIG. 1 illustrates a traditional response time of a liquid crystal display.

The present inventors came to the realization that it is not efficient to use the traditional response time data as the only quantitative description of the operational characteristics of a liquid crystal display, especially when comparing two similar liquid crystal panels where some response characteristics of one panel do not match the response characteristics of another panel when the liquid crystal displays are manufactured using somewhat different processes.

A new metric, referred to herein as "dynamic gamma" for purposes of identification, is more suitable for describing the temporal response of a liquid crystal panel than the traditional response time and the MPRT. Dynamic gamma and its two dimensional graphical representation have properties related to overdrive design and assessment. Dynamic gamma reveals the fundamental limitation to overdrive, and provide a straightforward technique for quantifying the effectiveness of an overdrive technique for a particular liquid crystal panel. Dynamic gamma also results in the quantitative comparison between two liquid crystal panels straightforward. In addition, the measurement of dynamic gamma is relatively simple, especially in comparison to MPRT.

The dynamic gamma metric may incorporate the gamma characteristics of the display. The gamma of a display describes the nonlinear relationship between the input digital-counts (0–255 if 8-bit) and the output luminance of a display. For example, the nonlinear relationship of a cathode ray tube display is a power function with exponent of approximately 2.2. The native static gamma of a liquid crystal panel is a sigmoid, and gamma correction circuitry is often used to make a liquid crystal panel have a gamma that is similar to that of a cathode ray tube. With reference to gamma, it is not used herein necessarily for a particular mapping, but rather, merely to indicate the mapping from a linear space to a non-linear space.

CRTs have relatively fast transitions from one level of luminance to another level. LCDs in contrast have a gradual and often slow transition from one luminance level to another level. The nonlinear relationship between the input digital-counts and the output luminance of LCD tends to change during a transition.

To more accurate characterize the dynamic input-output relationship of a liquid crystal panel during transition times, a characterization, referred to herein as "dynamic gamma," is presented. A dynamic gamma value is the luminance at a temporal time point after a transition starts. The time point after transition may be a predetermined duration, related to the transition selected otherwise related to the presentation of sequential frames of a video. The fixed time point is preferably selected to be one frame time after a transition starts. More specifically, a dynamic gamma value may be defined as the actual display luminance value at one frame time after a new driving value is applied.

To reduce the influence of disparity between different liquid crystal panels, the measured display luminance of a liquid crystal panel may be normalized by its gamma. More specifically, the measured display luminance may be mapped back through the inverse gamma curve to the digit-count domain (0–255 if the liquid crystal panel is 8-bit).

The traditional transition time describes the dynamic input-output relationship of a liquid crystal panel during transition times in a way, illustrated in FIG. 1. In other words, response time measures the transition time required for a pixel to transit from a starting value and to reach a value pre-set by the starting luminance and the targeted luminance. On the contrary, dynamic gamma measures the actual luminance after one frame to transit from a starting luminance and to reach a targeted luminance. In summary, the traditional transition time measures the time when a fixed luminance is reached, while the latter measures the luminance when a fixed time is reached. Other temporal time periods may likewise be used, such as an integer number of frame times, or otherwise any suitable time which is normally before the final luminance value is reached, albeit not necessarily a requirement.

The dynamic gamma preferably has two input valuables: starting luminance and targeted luminance. Dynamic gamma also sparsely samples the range (for example, 9×9) of the two input valuables to cover a set of possible transitions, such as all or a majority of the available transitions.

Figure 2A:
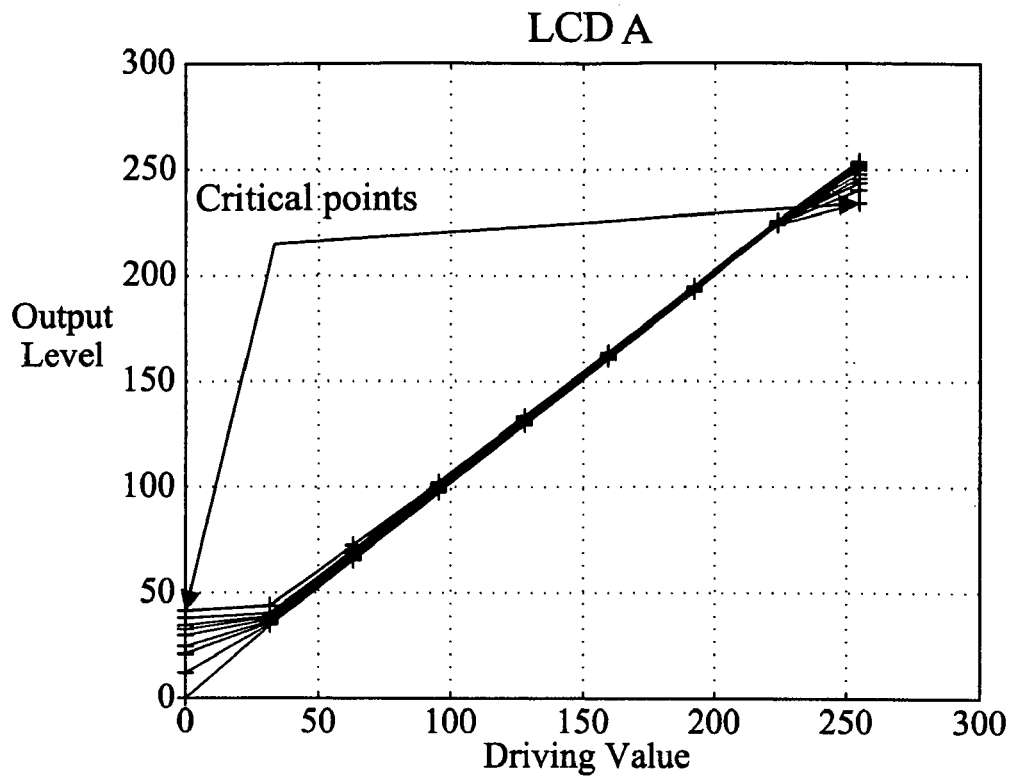
FIGS. 2A and 2B illustrates two-dimensional plots of dynamic gamma curves.
Figure 2B:
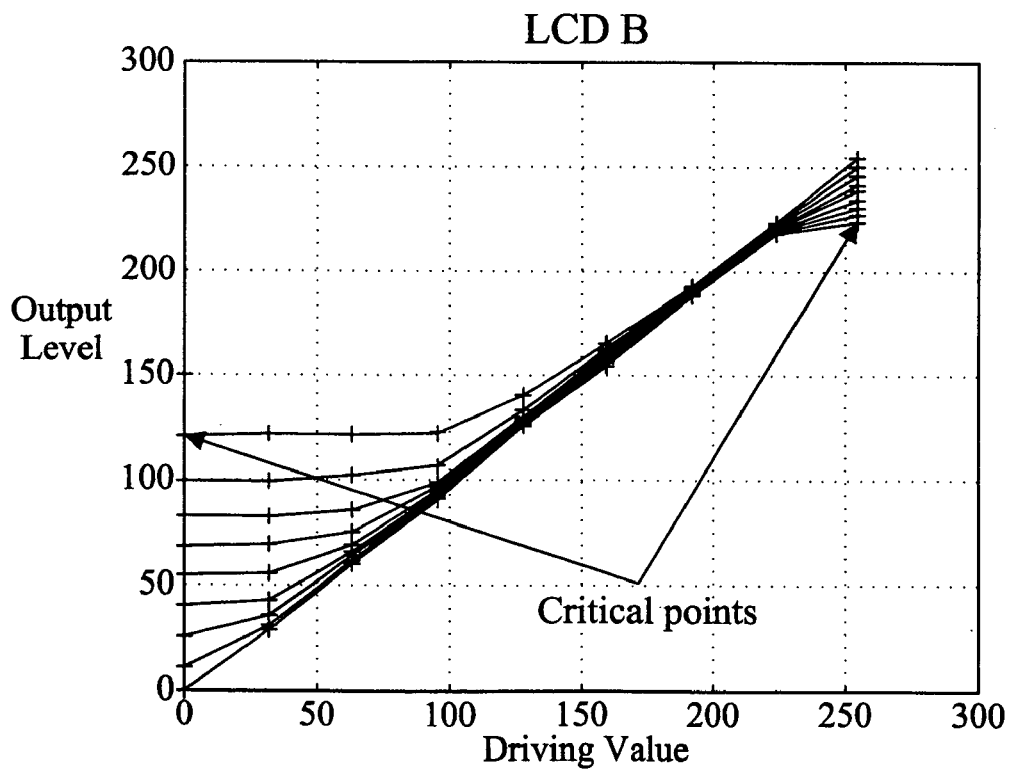

Different from response time that is typically represented by three dimensional bar graphs, dynamic gamma is preferably illustrated as a set of two-dimensional curves, such as shown in FIGS. 2A and 2B. These curves may be referred to as dynamic gamma curves. Each curve characterizes the relationship between the display luminance and the driving value with the same starting luminance value, and different curves represent different starting values. For the purpose of convenience, dynamic curves may be indexed by their starting values. For example, curve 0 represents the curve starting with luminance value 0.

Figure 3:
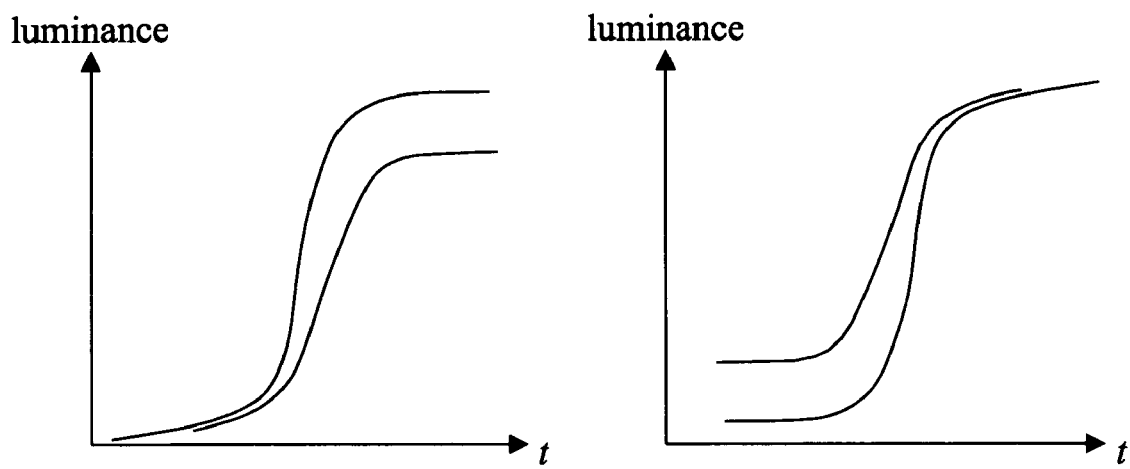
FIG. 3 illustrates two transition curves starting from the same luminance but with different driving values.

More specifically, FIGS. 2(a) and (b) illustrate two two-dimensional plots of dynamic gamma curves measured from two liquid crystal panels (LCD A & B) that were built using different technology. Graphically showing 9×9 measured data, FIGS. 2(a) and (b) illustrate four properties of dynamic gamma:

(1) FIGS. 2A and 2B shows a pattern that every curve is monotonically increasing, and the curves with higher starting luminance are above the curves with lower starting luminance. This pattern reflects the fact of liquid crystal panels that (i) the luminance of a transition is always higher than the luminance of another transition starting from the same starting luminance but with lower driving value, and (ii) the luminance of a transition is higher than the luminance of another transition with same driving value but starting from the same starting luminance, as illustrated in FIG. 3.

(2) The curves in FIGS. 2A and 2B are generally scattered. The scattering is caused by the slow response of liquid crystal panels, and the area that the curves cover reflects the degree of slowness of a liquid crystal panel's temporal response. The faster a liquid crystal panel is, the smaller the scattered area is. An ideal liquid crystal panel with instantaneous response has the dynamic gamma curves converged to one curve. Because the input-output dynamic gamma relationships are normalized to digit-count vs. digit-count domains, the converged curve is a linear line with identical input and output.

(3) The nine dynamic gamma curves in FIGS. 2A and 2B may be directly used to derive a 9×9 overdrive lookup table. Given a current targeted value and previous frame value, the system may determine the curve that is corresponding to the previous frame value. Then the system determines the driving value on this curve that make the targeted value, and the driving value is the overdriving value. For example, for LCD A with dynamic gamma curves shown in FIG. 2A, if one wanted to have 50 at the current frame and the previous frame is 0, one may first find the curve 0; then find 120 on this curve as the overdrive value that can make output to be 50.

(4) FIGS. 2A and 2B shows that, for any starting luminance, there is certain luminance that can never be reached after one frame. As an example, one can see in FIG. 2 that if the starting luminance is white (255), both LCD A and B cannot reach black (0) within one frame cycle; if the starting luminance is black (0), both panels cannot reach white (255) within one frame cycle. The measured dynamic gamma values quantitatively describe the dynamic characteristics of a liquid crystal panel. Unlike transition times in which smaller values are for better temporal response, dynamic gamma features the values closer to targeted values for better temporal response. In two dimensional plots, better temporal response has more converged dynamic curves.

The above quantitative characterization of a liquid crystal panel's temporal response requires a significant number of the dynamic gamma values. Nevertheless, the number of values used to serve this purpose can be greatly reduced. Specifically, it is the size of the area that a set of dynamic gamma curves scatter that quantitatively describes the dynamic characteristics of a liquid crystal panel. Despite so many curves, the size of the area is actually determined only by two dynamic gamma curves: the top one (starting luminance 255 if 8-bit) and the bottom one (starting luminance 0). The rest curves fall between the two curves according to the first property discussed previously. Therefore, for a 9×9 measured dynamic gamma values, only 2×9 values that correspond two sets of transitions starting from 0 and 255, respectively. As an example, the size of this area of LCD B in FIG. 2(b) is much larger than the ones of LCD A in FIG. 2(a), indicating that LCD B has much slower temporal response.

Furthermore, one number derived from these multiple dynamic curves can be used to characterize the temporal response of an LC panel. Specifically, this number is defined as $$dg = \sqrt{\frac{1}{2J}\sum_{i=0}^{I-1}\sum_{j=0}^{J-1}(lum_{ij} - LUM_j)^2}$$

where I is the number of starting luminance, J is the number of targeted luminance, $lum_{ij}$ is the dynamic gamma value with the ith starting luminance and the jth targeted luminance, and $LUM_j$ is the jth targeted luminance value. The above equation calculates the deviation of dynamic gamma values from the targeted values. The number dg describes the area that the dynamic curves scatter. Ideally, if a panel has instant temporal response, dg should be 0. Smaller dg is, faster a panel is.

Dynamic gamma curves of a particular liquid panel can be used to assess the quality of overdrive. More importantly, they reveal the capability and the limitation of overdrive applied to the panel. Overdrive applies a driving value that is based on the previous frame and current frame to accelerate the transition. As previously discussed, the ideal fast panel has a set of dynamic gamma curves that converge to one straight line. Therefore, a good overdriven panel should converge toward one straight line.

Figure 4A:
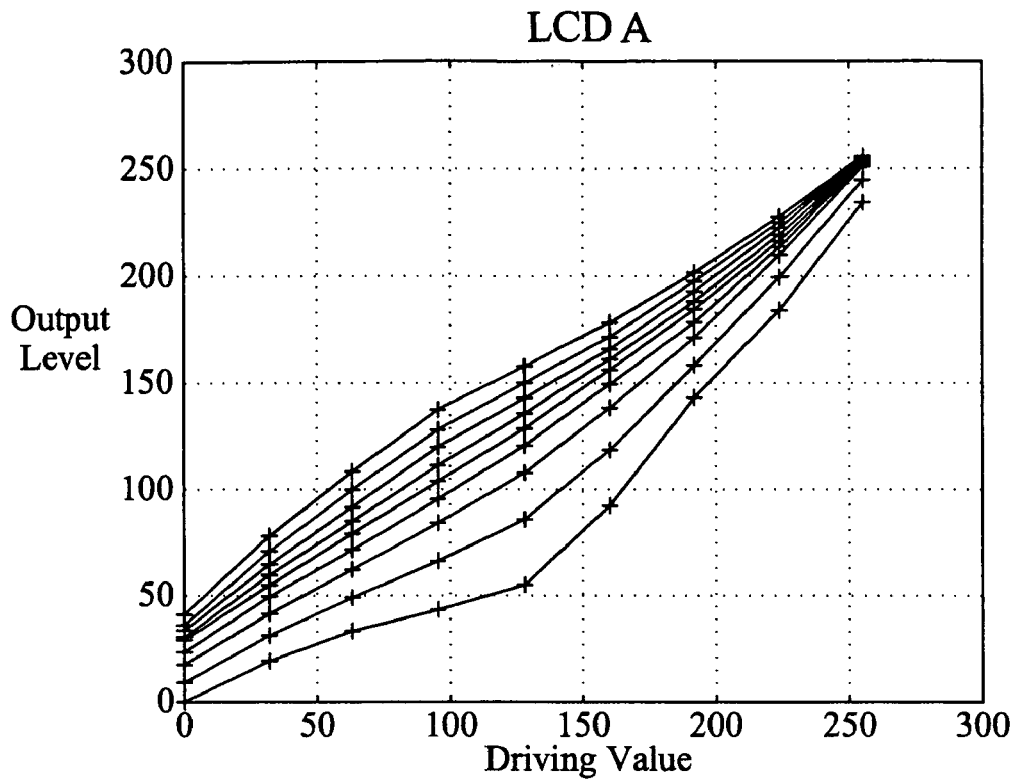
FIGS. 4A and 4B illustrates dynamic gamma curves after overdrive.
Figure 4B:
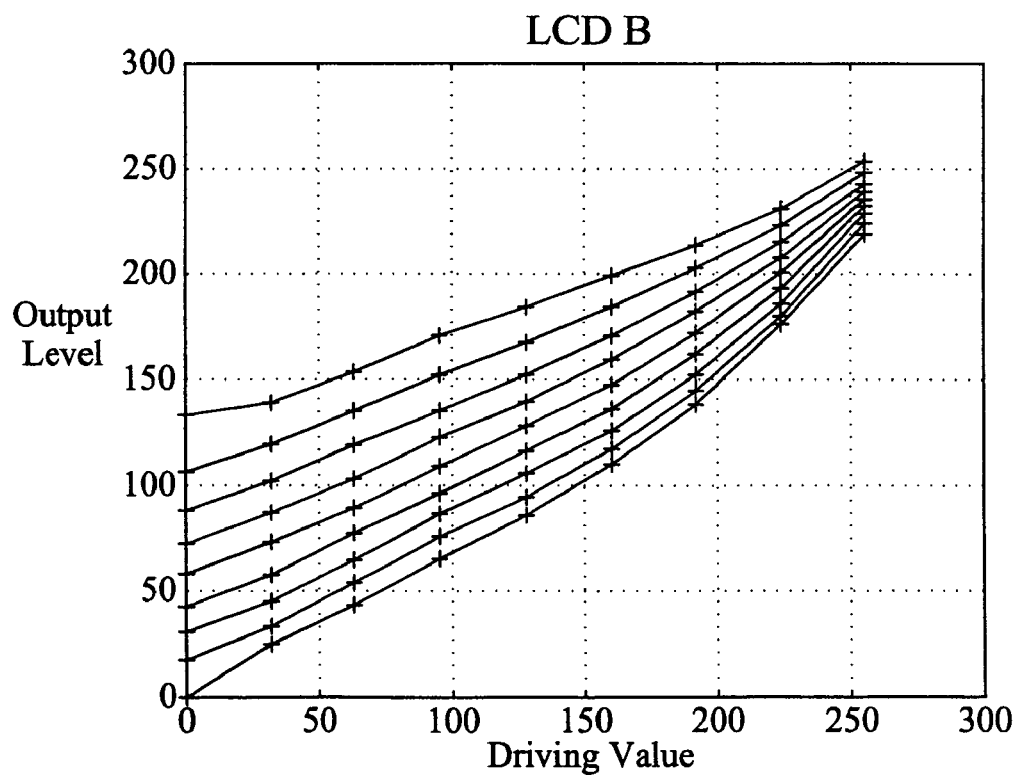

Nevertheless, overdrive is never perfect. FIGS. 4A and 4B illustrates measured dynamic gammas of two LC panels (LCD A & B) that overdrive technology has been applied to. The dynamic gamma curves in both FIGS. 4A and 4B almost converge to one single line except the two ends. The two triangular "dead zones" at the two ends are not due to 'bad' overdrive, but due to the fundamental limitation of overdrive technology.

The imperfection of overdrive technology comes from the fact that for any starting luminance, certain luminance may not be reached after one frame because the input driving values have to be with the range from 0 to 255. Therefore overdrive does not 100% solve the slow response problem of a liquid crystal panel.

The quantitative description of the imperfection of overdrive can be provided by dynamic gamma. From FIGS. 4A and 4B, one can observe that two critical points determine the size of dead zones. The lower critical point represents the transition from 255 to 0, and the higher critical point represents the transition from 0 to 255. In summary, two particular dynamic gamma curves, 0 and 255, among all the curves, are most important. The area that the two curves cover reflects the temporal response of a liquid crystal panel. Each curve possesses a critical point that sets the capabilities for the overdrive performance.

Because the on-off characteristics of LCD B are also much worse than that of LCD A, even with overdrive, LCD B still cannot catch up with LCD A. In FIGS. 4(a) and (b), the overdrive dead zones of LCD B are much bigger than LCD A. In fact, LCD B cannot reach the desired level for most values within one frame period. Such a liquid crystal panel, compared with LCD A, is not a good candidate for video based applications.

Figure 5:
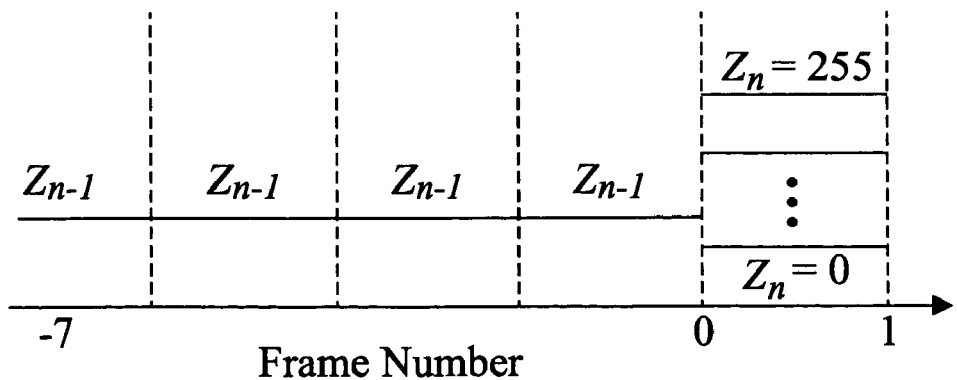
FIG. 5 illustrates the input driving sequences for measurement of dynamic gamma.

The measurement system for dynamic gamma may include a driving input illustrated in FIG. 5. Before frame 0, the driving value $Z_{n-1}$ is applied for several cycles to make the pixel into equilibrium state. Then in the frame 0, different driving value $Z_n$, covering the driving range (from 0 to 255 for 8-bit liquid crystal panel), is applied, and the corresponding luminance is measured at the end of frame 0.

Figure 6:
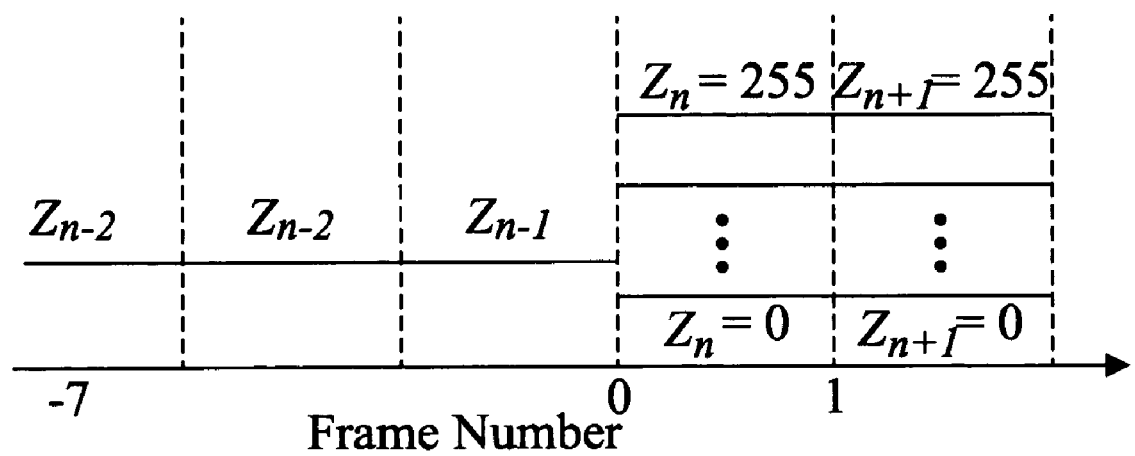
FIG. 6 illustrates the input driving sequence for measurement of second-order dynamic gamma.

A second-order dynamic gamma value is defined as the actual display luminance value at two frame times after two consecutive new driving values are applied. FIG. 6 illustrates a driving sequence for measurement of the second-order dynamic gamma. The measurement is taken at the end of frame 1, and the driving values of frame 1 are different from ones of frame 0.

Figure 7A:
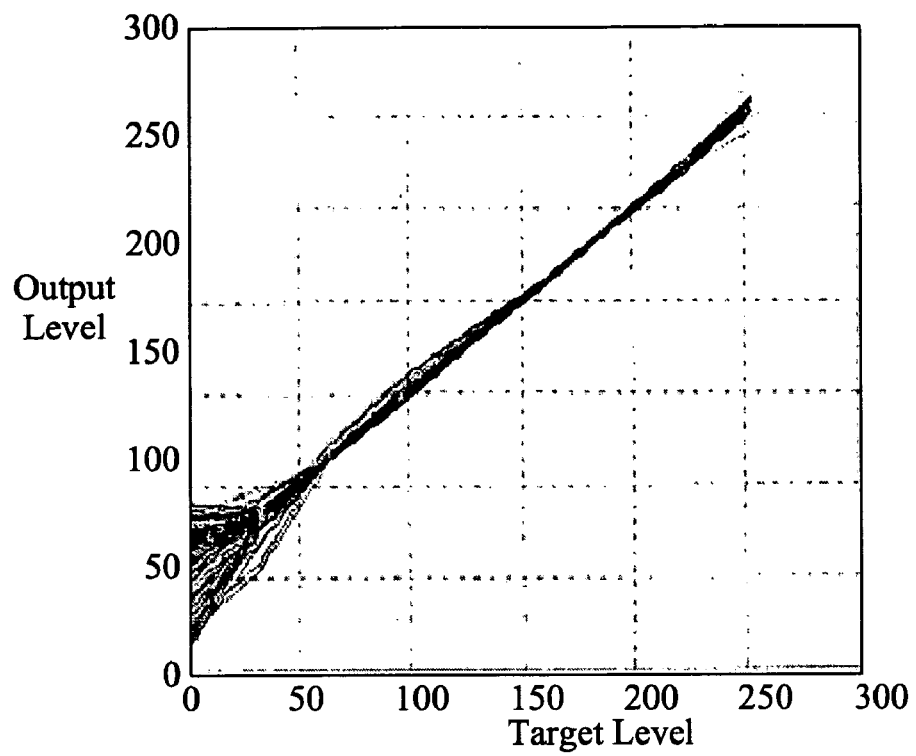
FIGS. 7A and 7B illustrate model based and convention overdrive techniques.
Figure 7B:
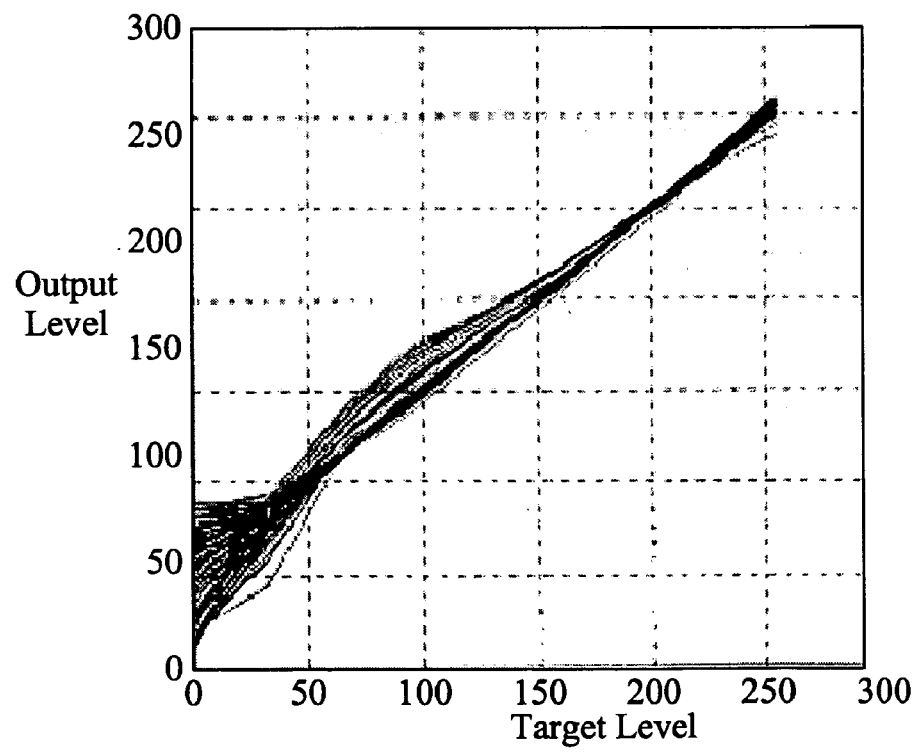

The second order dynamic gamma can be plotted as the same two-dimensional curves as the first-order dynamic gamma. The second order dynamic gamma can assess the quality of overdrive algorithms. FIGS. 7A and 7B illustrate the second order dynamic gamma of a liquid crystal panel with two overdrive techniques, namely, FIG. 7A model-based overdrive and FIG. 7B conventional based overdrive. The first order dynamic gamma shows now significant difference between the two overdrive techniques, but the second over dynamic gamma curves in FIGS. 7A and 7B illustrate that the model based overdrive technique results in less spread in the mid-tone area than the non-model based conventional overdrive technique.

Figure 8A:
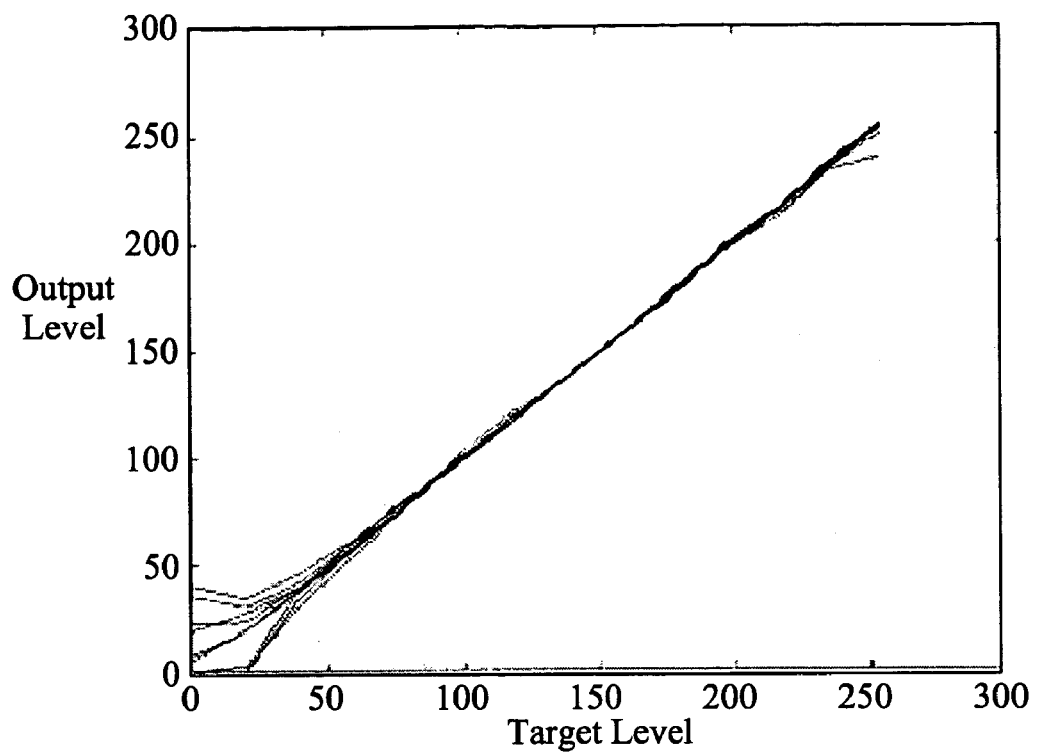
FIGS. 8A and 8B illustrate dynamic gamma curves.

The metric may take into account the human visual system characteristics. One method is to plot the dynamic gamma as a function of lightness for both the input (desired lightness) and output (resulting lightness) axes, as shown in FIG. 8A. However, since L*(approx. cube-root) is close to the gamma-corrected space of the video code values, the effect is relatively small. It does act to stretch out the deviations at the dark end of the tonescale, though.

Figure 8B:
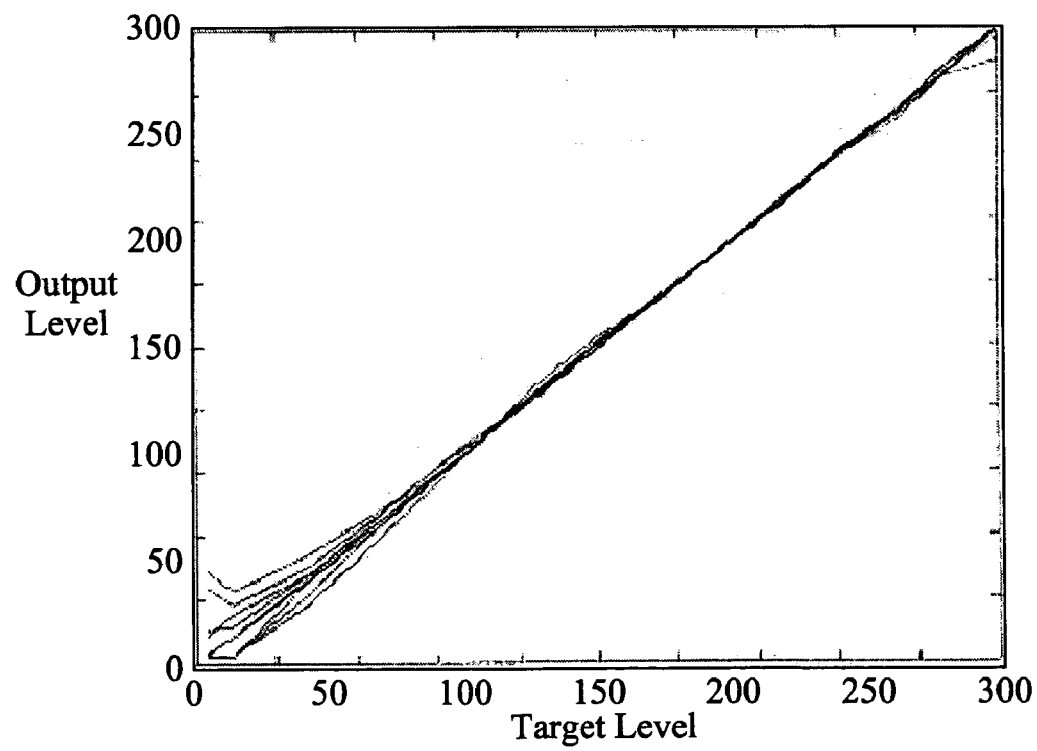

However, this does not mean the dynamic gamma is robust against the visual system, as one can easily operate the system at different frame rates (e.g., 30 hz, 60 hz, and 120 Hz). In such a case, the visibility of the same dynamic gamma problems will vary widely. The system may project visual tolerances in the dynamic gamma plots (even when represented as merely code values) to give guidance if the deviations described in FIG. 8B. are indeed visible.

The presentation of the graphical illustration shown in FIG. 4 is especially suitable to characterize the display or provide meaningful distinguishing between different displays. The illustration may be presented in any suitable manner, such as on a display, an electronic document or a printed document. In addition, the illustration provides meaningful comparison when provided on a card (such as paper or plastic) in a location viewable by a purchaser together with the actual display to which the card corresponds. In this manner, several different displays on a shelf at a store together with corresponding cards, provides the ability for the purchaser to make an informed decision.

In some cases, it is desirable to have the display and pixels in a steady state of operation. The pixels are then driven over a predetermined time period, such as one frame time, to an intermediate luminance level. The intermediate luminance level is measured by the system. The pixels are then driven over a predetermined time period, such as one frame to, to another luminance level. The another luminance level is measured by the system. In some cases, the system may include overdrive circuitry, either internal to the display or external to the measurement system. The number of measurement points may be selected, as desired.

The invention claimed is:
1. A method for determining the response characteristic of a liquid crystal display, said method comprising:
 (a) establishing an initial luminance value for said display;
 (b) thereafter driving said display to a target luminance value;

(c) after a predetermined time interval, measuring the actual luminance value of said display as a function of said initial luminance value and said target luminance value;

(d) repeating steps (b) and (c) for a plurality of target luminance values;

(e) repeating steps (a) through (d) for a plurality of initial luminance values; and (f) characterizing a response time of said display based upon said measured actual luminance values.

2. The method of claim 1 where said predetermined time interval is a frame of video.

3. The method of claim 1 using nine said initial luminance values and nine said target luminance values.

4. The method of claim 1 where said characterization of said response time is graphically represented by a plurality of curves plotting measured luminance versus driving luminance, each curve representing an initial luminance value.

5. The method of claim 4 where said characterization of said response time is expressed by the area between the outermost of said plurality of curves.

6. A method for determining a dynamic gamma response characteristic of a liquid crystal display, said method comprising:

(a) overdriving said display;

(b) establishing an initial luminance value for said display;

(d) after a predetermined time interval, measuring the actual luminance value of said display as a function of said initial luminance value and said target luminance value;

(e) repeating steps (c) and (d) for a plurality of target luminance values;

(f) repeating steps (b) through (e) for a plurality of initial luminance values; and (g) characterizing a response time of said display based upon said measured actual luminance values.

7. The method of claim 6 wherein said predetermined time interval is based upon a integer number of frame time periods.

8. The method of claim 7 wherein said integer is one.

9. The method of claim 6 where said characterization of said response time is graphically represented by a plurality of curves plotting measured luminance versus driving luminance, each curve representing an initial luminance value.

10. The method of claim 9 where said plurality of curves converge over a central linear region and diverge at one or more ends of said linear region, and where said characterization of said response time is expressed by the area between the outermost of said plurality of curves within at least one of said one or more ends of said linear region where said plurality of curves diverge.

11. A presentation of a response characteristic of a liquid crystal display:

(a) a first axis indicating a range of driving values for the luminance of said display;

(b) a second axis indicating luminance values for said display;

(c) a plurality of lines indicated on said presentation measured by said first and second axis, wherein each of said lines provides an indication of a second luminance value at a common first time between a transition from a first luminance value toward said second luminance value, wherein said first time is not based upon the measured luminance of said display.

* * * * *

UNITED STATES PATENT AND TRADEMARK OFFICE
CERTIFICATE OF CORRECTION

PATENT NO. : 7,164,284 B2  Page 1 of 1
APPLICATION NO. : 10/965059
DATED : January 16, 2007
INVENTOR(S) : Hao Pan et al.

It is certified that error appears in the above-identified patent and that said Letters Patent is hereby corrected as shown below:

Col. 7, line 28 (Claim 6)
Change "(d)" to --c--.

Col. 7, line 32 (Claim 6)
Change "(e) repeating steps (c) and (d)" to --(d) repeating steps (b) and (c)--.

Col. 7, line 34 (Claim 6)
Change "(f) repeating steps (b) through (e)" to --(e) repeating steps (a) through (d)--.

Col. 8, line 1 (Claim 6)
Change "(g)" to --(f)--.

Signed and Sealed this

First Day of July, 2008

JON W. DUDAS
*Director of the United States Patent and Trademark Office*